United States Patent [19]

Deline et al.

[11] 4,400,132
[45] Aug. 23, 1983

[54] SKIDDING GRAPPLE HAVING WINCH-LINE CAPABILITY

[75] Inventors: Richard R. Deline, Lake Oswego; William R. Miner, Portland, both of Oreg.

[73] Assignee: Esco Corporation, Portland, Oreg.

[21] Appl. No.: 275,795

[22] Filed: Jun. 22, 1981

[51] Int. Cl.³ .......................... B66C 1/10; B66C 1/42
[52] U.S. Cl. ................................... 414/569; 254/327
[58] Field of Search ..................... 414/569, 734, 735; 254/325–327

[56] References Cited

U.S. PATENT DOCUMENTS 3,362,550  1/1968  Kappler ............................. 414/734
4,102,528  7/1978  Cripe ................................. 414/569

Primary Examiner—Robert B. Reeves
Assistant Examiner—James Barlow
Attorney, Agent, or Firm—Tilton, Fallon, Lungmus & Chestnut

[57] ABSTRACT

A skidding grapple having a self-propelled vehicle equipped with a saddle carrying a boom and grapple horizontally and vertically swingable thereon, a fairlead assembly removably mounted atop the saddle and a winch having a line reeled thereon positioned forward of the saddle and the line passing through the fairlead assembly.

5 Claims, 7 Drawing Figures

SKIDDING GRAPPLE HAVING WINCH-LINE CAPABILITY

BACKGROUND AND SUMMARY OF INVENTION

This invention relates to a skidding grapple having winch-line capability and, more particularly, to a skidding grapple having a uniquely mounted fairlead assembly to provide the winch-line capability.

The invention finds particular use in the logging industry although other uses for skidding grapples are well known such as marine applications and the like. For many years, self propelled vehicles used in the logging industry were equipped with either grapples or winch lines but not both. In other areas a winch line was installed in conjunction with a grapple as seen in U.S. Pat. No. 3,112,830.

For the last 15 years or so, the logging industry has utilized the grapple with winch-line capability of U.S. Pat. No. 3,362,550. There, as in the U.S. Pat. No. 3,112,830, the winch-line operated in conjunction with the boom of the grapple. This has proved disadvantageous to logging operators in limiting the scope of the logging operation and inducing extra fatigue stresses into the winch-line. It will be appreciated that the winch-line when attached to logs is under tremendous stress and a premature rupture could result in a whip-like action posing dangerous potential to people and equipment in the vicinity.

According to the invention, the problems of the prior art and notably those of the U.S. Pat. No. 3,362,550 are overcome through a uniquely positioned and constructed fairlead assembly which is adapted to selectively cooperate with the boom of the grapple when advantageous. More particularly, the fairlead assembly is mounted atop the saddle provided on the vehicle rear and which provides bearing support for the king-post apparatus utilized in conjunction with the vertical and horizontal swingable boom of the grapple. The fairlead assembly has a guide roller journalled for rotation about a horizontal axis which is substantially above the saddle but which directs the winch-line loading directly therethrough to the vehicle chassis and which makes possible the independent use of the winch-line so as to avoid fatigue stresses introduced by kinking but while still having available the boom for use as a counterweight.

Other objects and advantages of the invention may be seen in the details of the ensuing specification.

DETAILED DESCRIPTION

The invention is described in conjunction with an illustrative embodiment in the accompanying drawing, in which.

Figure 1:
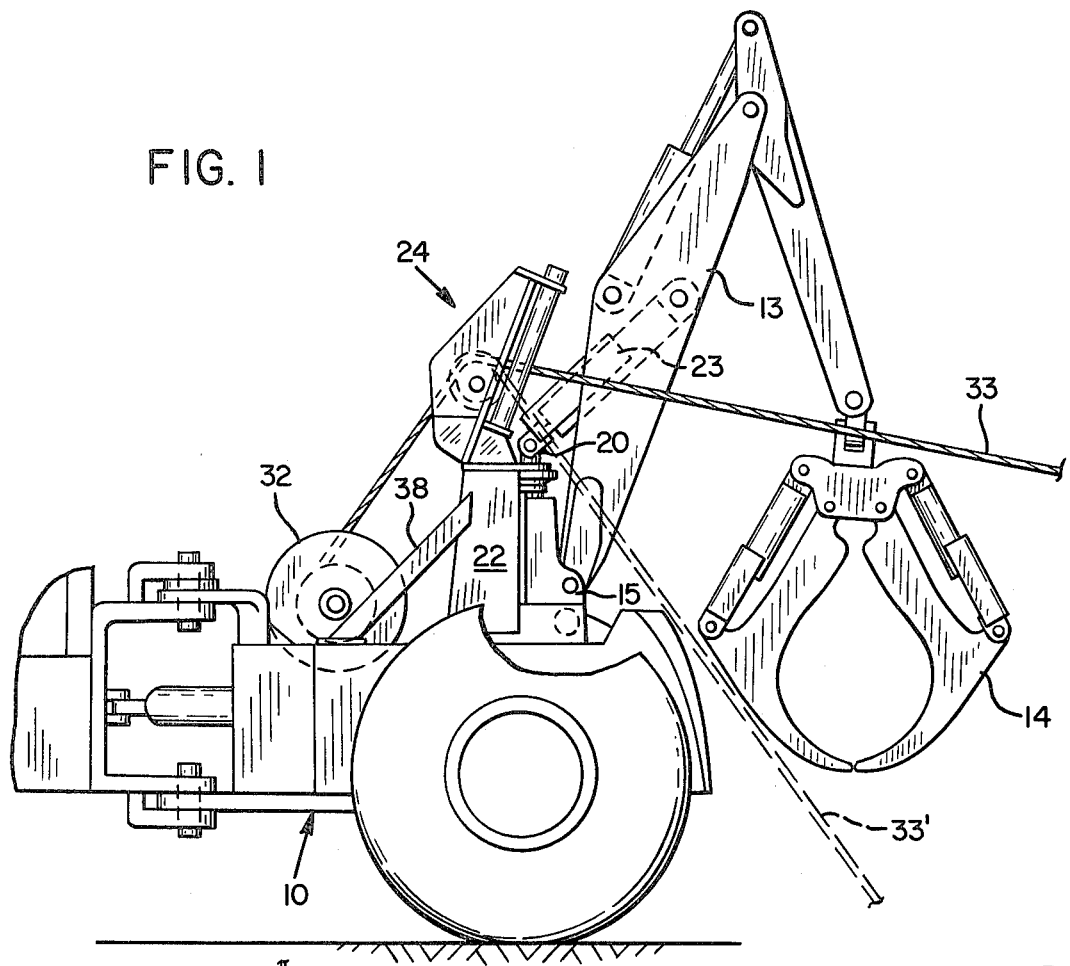
FIG. 1 is a fragmentary elevational view of a self-propelled vehicle equipped with the invention.

In the illustration given and with reference first to FIG. 1, the numeral 10 designates generally the articulated rear portion of a self-propelled vehicle. The vehicle can be seen in schematic top plan view in FIG. 7 where the forward self-propelled portion is designated 11 and wherein the chassis 12 is equipped with a swingable boom 13.

Returning to FIG. 1, the boom 13 is also of an articulated nature (in two sections) and at its outer end is equipped with a grapple 14.

Figure 3:
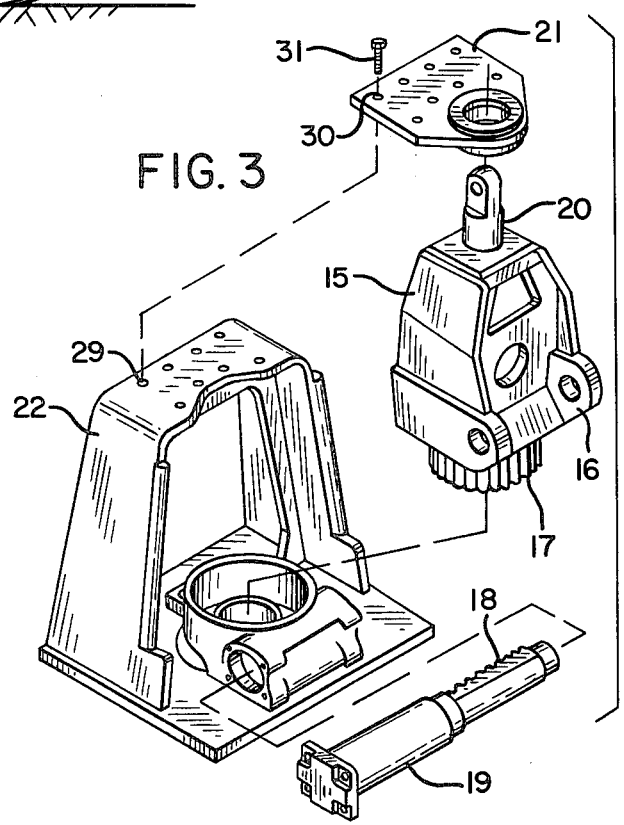
FIG. 3 is an exploded perspective view of the saddle and king-post apparatus portion of the grapple.
Figure 4:
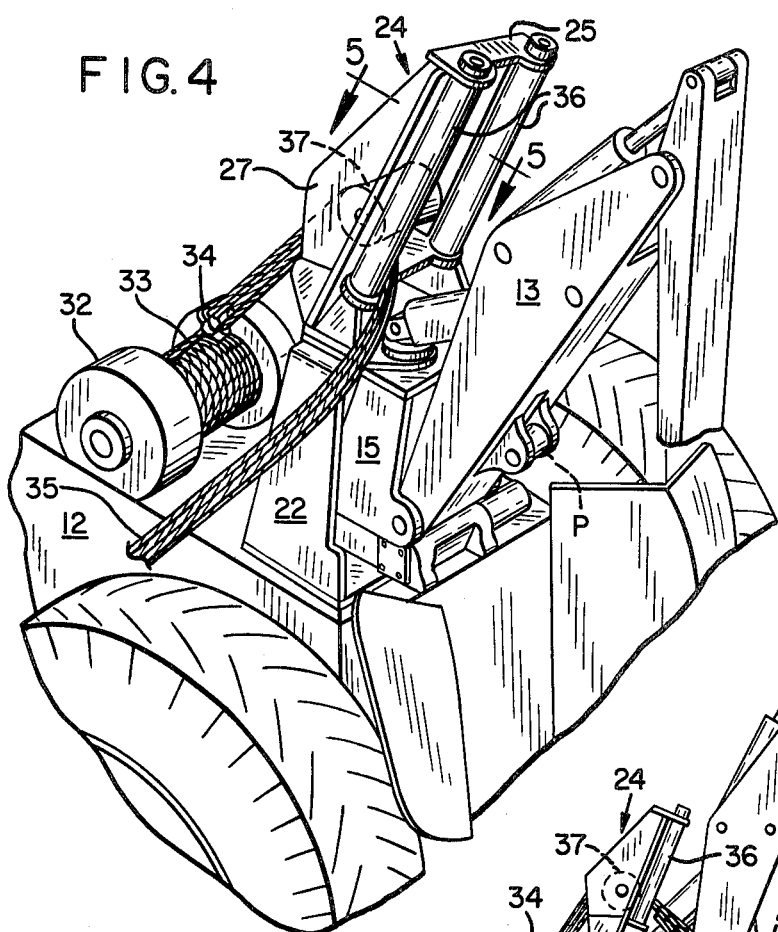
FIG. 4 is a fragmentary perspective view of the invention showing the winch-line retracted and out of the way when not in use and with the boom equipped (in dotted line) with the guide assembly of the prior art.

Reference to FIG. 4 illustrates that the boom 13 is pivotally mounted on king-post apparatus 15 which in turn is mounted on the chassis 12. The king-post apparatus 15 is better seen in FIG. 3 and includes a weldment equipped with lugs as at 16 for the receipt of the lower portion of the boom 13. The apparatus 15 is equipped with a pinion gear as at 17 which is turned by the rack 18 of the swing cylinder 19. The king-post itself is designated 20 and is journalled within a bearing cap 21 which is boltably secured to a saddle 22 mounted on the chassis 12. A cylinder 23 (see FIG. 1) is interconnected between the king-post 20 and the boom 13 to provide for vertical swinging of the boom and thus the grapple 14.

Figure 2:
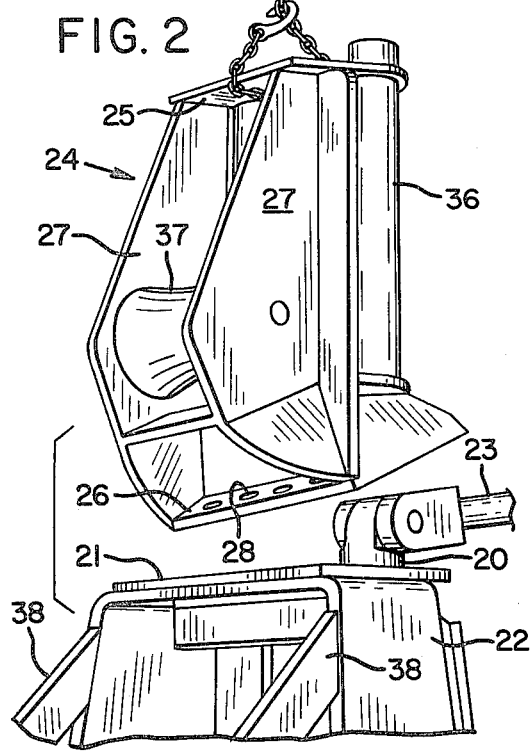
FIG. 2 is a fragmentary perspective view showing a fairlead assembly in the process of being installed on the saddle portion of the grapple.

Mounted atop the saddle 22 (see FIG. 1) is a fairlead assembly generally designated 24. In FIG. 2, the fairlead assembly 24 is seen in the process of being installed atop the saddle 22 and the assembly 24 is seen to include a top wall 25, bottom wall 26 and sidewalls 27. The bottom wall 26 is equipped with a plurality of bolt openings 28 which are alignable with the bolt openings 29 in the saddle 22 and the bolt openings 30 in the bearing cap 21. Thus, where the fairlead assembly is to be installed on an already operable skidding grapple, it is merely necessary to remove the bolts 31 (see FIG. 3) and re-install the same or larger bolts through the aligned openings 28-30 for securing the fairlead assembly 24 atop the saddle 22.

Figure 6:
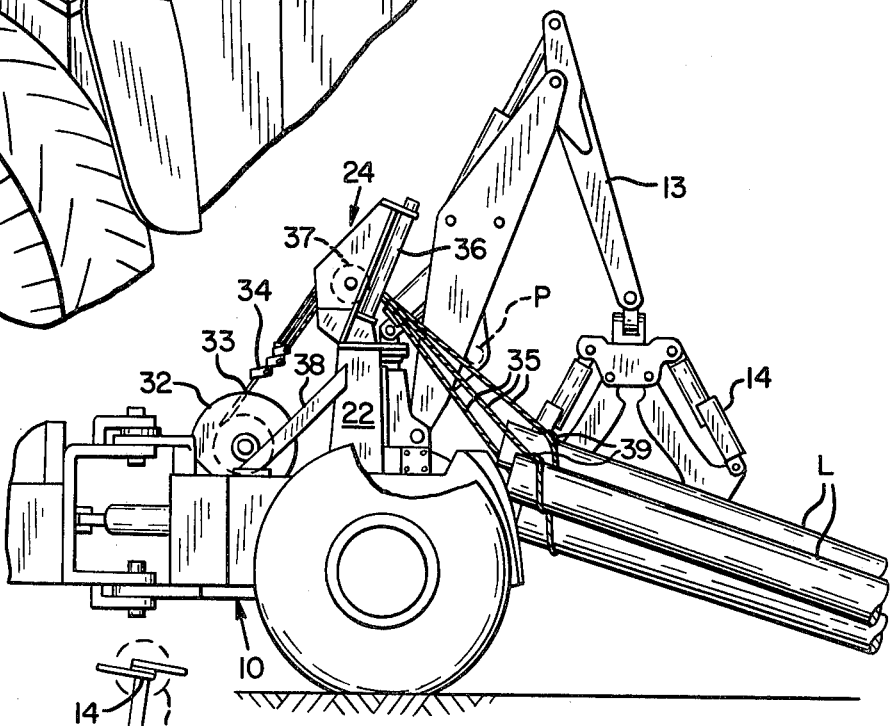
FIG. 6 is a view similar to FIG. 1 (on slightly reduced scale) and showing the advantageous feature of being able to elevate logs attached to the winch-line.

Referring now to FIG. 6, the vehicle 10 is seen to be equipped with a winch 32 mounted forwardly of the saddle 22 and which has reeled thereon a winch-line 33. The winch-line 33 passes through the fairlead assembly 24 and is connected to logs as at L. More particularly, the winch-line 33 (see also FIG. 1) is equipped with a plurality of winch-line hooks 34 (designated only in FIG. 6) and which in turn carry chokers 35 looped around the logs L and held in place by means of choker hooks 39. A more detailed illustration of the winch-line, hook arrangement can be seen in co-owned U.S. Pat. No. 3,276,809.

FIG. 6 illustrates an important advantage of the instant invention in that the provision of a fairlead assembly according to the invention atop the saddle makes possible the passage therethrough of the winch-line hooks—in contrast to the guide means of the prior art as indicated in phantom at P in FIGS. 4 and 6 whereby it is possible to achieve substantial elevation of the forward end of the logs, even though the same be "chokered", i.e., secured by means of choker hooks and choker lines leading to the winch-line hooks 34.

Another advantage of the invention can be appreciated from a consideration of FIG. 4. There it is seen that the choker lines 35 are curled out of the way of the boom 13—thereby affording complete freedom of movement to the boom and made possible by the elevated, removed location of the fairlead assembly 24.

Figure 5:
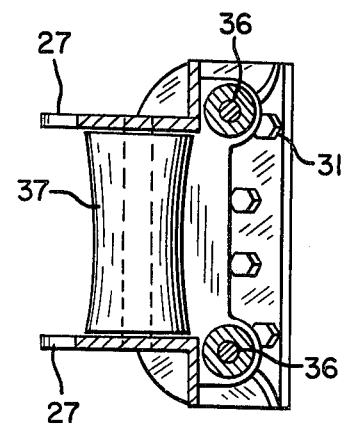
FIG. 5 is a sectional view taken along the sight line 5—5 of FIG. 4.

The fairlead assembly 24 includes the generally rectangular housing previously described in connection with walls 25-27 and is thereby open to the front and rear. Provided adjacent the rear opening are a pair of horizontally spaced apart rollers 36—see particularly FIG. 5. These are journalled for rotation about vertical axes and are spaced apart a distance sufficient to permit the winch-line hooks 34 to pass therebetween. In addition, the fairlead assembly includes a third guide roller 37 (again referring to FIG. 5) which is positioned near the lower portion of the fairlead assembly, i.e., adjacent the saddle 22. The guide roller 37 is journalled for rotation about a horizontal axis and provides the support for the stress imposed by the winch line or chokers, as the case may be.

In operation, the invention provides three modes. Because of the ready installability and removability, the vehicle 10 can operate without any winch-line, i.e., with the grapple being the sole means for moving logs and the like. This may be the preferred mode for a good deal of the work of many operators. In this connection, saddle straps 38 are employed and these aid in the lifting function of the boom 13. They are independent of the fairlead and its function but are advantageous in providing additional support for the swinging boom. However, when winching is indicated, the fairlead assembly 24 is readily installed on the saddle 22 merely be removing and thereafter replacing the bolts 31. In doing this, the fairlead assembly 24 is stabilized by a support on the relatively husky saddle which has been engineered to transmit the swing forces developed by the king-post weldment 15. In this sense, the invention takes advantage of an already structurally strong feature of the vehicle.

Figure 7:
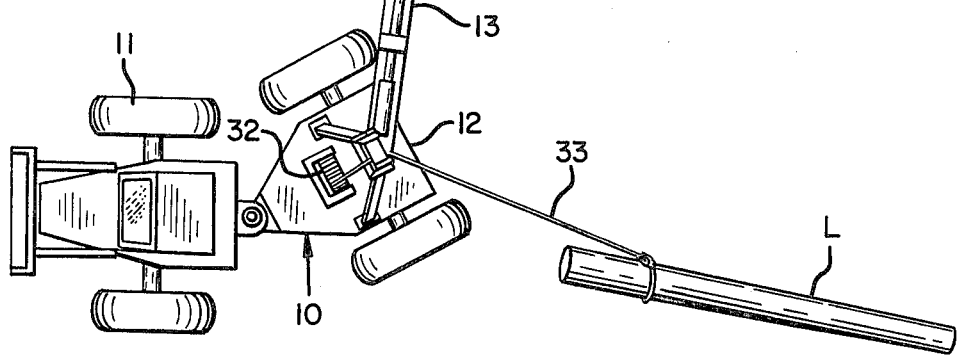
FIG. 7 is a somewhat schematic top plan view of the invention illustrating the advantageous use of the boom as a counterweight to a winched log.

When the fairlead assembly 24 is installed as illustrated in the drawing, the boom 13 can be moved to one side as illustrated in FIG. 7 and the winching performed as if the equipment had no boom and grapple. However, because of the presence of the boom and grapple, there is available the advantage of using the boom and grapple as a counterweight to balance the loading on the vehicle portion 12. This can be enhanced even further by having the grapple clasp a stump as at S in FIG. 7. It will be appreciated that because the boom functions in this mode completely independently of the winch-line, a wide dispersion of anchoring objects can be utilized—an activity or phenomenon heretofore unavailable to the art. In the winching operation, it is seen that the line direction changes but once—as it passes over the guide roller 37. Thus, there is less chance to kink and therefore less opportunity for fatigue.

Also because of the unique positioning of the fairlead assembly, and the rugged support therefor, it is possible to utilize a much larger assembly so as to develop adequate spacing between the vertical rollers 36 which enables the winch-line hooks to pass therethrough and develop a higher elevation of the forward end of the logs L as illustrated in FIG. 6.

Should the occasion occur for the third mode of operation, i.e., grappling without the use of the winch-line but when the fairlead assembly is in installed position, it is only necessary to curl the winch-line and/or chokers around the fairlead assembly as illustrated in FIG. 4.

A further advantage accrues over the winch-line assembly of the prior art in that the winch-line 33 can be brought much closer to the rear of the vehicle as illustrated in the position 33' of FIG. 1 for better loading distribution to machine.

While in the foregoing specification, a detailed description of an embodiment of the invention has been set down for the purpose of illustration, many variations in the details hereingiven may be made by those skilled in the art without departing from the spirit and scope of the invention.

We claim:

1. Load-transporting apparatus with grapple mechanism and independent load-hauling line comprising, a vehicle supported for movement over the ground, a boom on said vehicle projecting outwardly from the rear thereof, a saddle mounting the base of the boom on said vehicle accommodating horizontal swinging of the boom to permit swinging of the outer end of the boom laterally of the vehicle, and vertical swinging of the boom to permit raising and lowering of the boom's outer end, grapple mechanism swingably mounted on the boom adjacent its outer end, a fairlead assembly releasably mounted atop said saddle, a winch on said vehicle forward and below said assembly, and a winch-line reeled on said winch and extending through said fairlead assembly for connection to logs or the like independent of said boom and grapple whereby said boom is adapted to serve as a counterweight to a load secured to the free end of said winch-line, said fairlead assembly including a housing having a pair of horizontally spaced-apart rollers with said winch-line passing therebetween, said spacing being sized to pass a winch-line hook between said roller, said fairlead assembly including a generally rectangular housing having an open front and rear and defined by top, bottom and side walls, said bottom wall having bolt openings alignable with bolt holes in said saddle, said saddle including a king-post for accommodating the horizontal and vertical swinging of said boom, said assembly bottom wall bolt openings being forward of said king-post.

2. The structure of claim 1 in which said housing has a third roller journalled for rotation about a horizontal axis and positioned adjacent said saddle whereby said winch-line passes over said third roller in passing between said pair of rollers with said third roller constituting the only means for changing the vertical direction of said winch-line between said winch and a load on said winch-line.

3. The structure of claim 2 in which said fairlead assembly includes a generally rectangular housing having front, rear and sidewalls defining an open front and rear, said saddle including a king-post disposed below said third roller whereby said winch-line when not in use is adapted to be curled forwardly away from said king-post.

4. A skidding grapple comprising a self-propelled vehicle having a chassis equipped with a saddle adjacent the rear end thereof, a boom horizontally and vertically swingably mounted at one end in said saddle and having a grapple mounted on the other boom end, a fairlead assembly removably mounted atop said saddle, a winch mounted on said vehicle forward of said saddle and having a winch-line reeled thereon, said winch-line passing through said fairlead assembly independent of said boom, said fairlead assembly being arranged and constructed to have winch-line hooks on said winch-line pass through said fairlead assembly whereby logs chokered to said winch-line hooks are adapted to have their forward ends elevated, said saddle including a king-post apparatus for accommodating the swinging movement of said boom, said apparatus including an upper bearing cap boltably secured to the top of said saddle, said fairlead assembly being equipped with bolt holes for common securement to said saddle forward of said apparatus.

5. The structure of claim 4 in which said saddle includes a generally inverted, U-shaped member, said fairlead assembly having a guide roller journalled on a horizontal axis, said guide roller being substantially directly above said U-shaped member so as to transmit log loading vertically through said member to said chassis.

* * * * *